(12) United States Patent
Christoph et al.

(10) Patent No.: US 9,225,254 B2
(45) Date of Patent: Dec. 29, 2015

(54) SUPPLY CIRCUIT HAVING AT LEAST ONE SWITCHING UNIT COUPLED BETWEEN A BRIDGE CIRCUIT AND AN ASSOCIATED LOAD CIRCUIT

(75) Inventors: Martin Paul Christoph, Aachen (DE); Joseph Hendrik Anna Maria Jacobs, Eygelshoven (NL); Dirk Hente, Wuerselen (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 894 days.

(21) Appl. No.: 13/203,390

(22) PCT Filed: Feb. 23, 2010

(86) PCT No.: PCT/IB2010/050779
§ 371 (c)(1),
(2), (4) Date: Aug. 25, 2011

(87) PCT Pub. No.: WO2010/097753
PCT Pub. Date: Sep. 2, 2010

(65) Prior Publication Data
US 2012/0001569 A1    Jan. 5, 2012

(30) Foreign Application Priority Data

Feb. 26, 2009    (EP) .................................... 09153748

(51) Int. Cl.
*H05B 37/02*    (2006.01)
*H02M 3/337*    (2006.01)
(Continued)

(52) U.S. Cl.
CPC ........... *H02M 3/337* (2013.01); *H05B 33/0818* (2013.01); *H02M 2001/009* (2013.01);
(Continued)

(58) Field of Classification Search
CPC ......... H05B 37/02; H05B 33/08; H02M 3/22; H02M 7/42
USPC ........... 363/17, 20, 21.02, 123, 132; 315/224, 315/225, 226, 276, 283, 287, 299, 291
See application file for complete search history.

(56) References Cited

U.S. PATENT DOCUMENTS 5,563,473 A * 10/1996 Mattas et al. .................. 315/240
6,369,525 B1    4/2002 Chang et al.
(Continued)

FOREIGN PATENT DOCUMENTS

SU           860164 A     8/1981
WO         0145241 A1     6/2001
(Continued)

OTHER PUBLICATIONS

Ho et al., "Design and analysis of discontinuous mode series resonant converter", Industrial Technology, 1994, pp. 486-489.
(Continued)

*Primary Examiner* — Thuy Vinh Tran
(74) *Attorney, Agent, or Firm* — Yuliya R. Mathis

(57)    ABSTRACT

A supply circuit includes: a bridge circuit, one or more resonant circuits coupled to the bridge circuit, each of the one or more resonant circuits being coupleable to a corresponding load circuit among one or more load circuits each of which includes one or more loads; one or more supply switching units, each of the one or more supply switching units being associated with a corresponding one of the one or more resonant circuits and being coupled between the bridge circuit and an associated one of the one or more load circuits for connecting and disconnecting the associated load circuit from the bridge circuit; and a control unit for controlling each of the one or more supply switching units in synchronization with a resonant current of the resonant circuit associated with the supply switching unit.

20 Claims, 5 Drawing Sheets

(51) Int. Cl.
*H05B 33/08* (2006.01)
*H02M 1/00* (2007.01)

(52) U.S. Cl.
CPC ...... *H02M2001/0058* (2013.01); *Y02B 20/348* (2013.01); *Y02B 70/1433* (2013.01); *Y02B 70/1491* (2013.01); *Y10T 307/406* (2015.04)

(56) References Cited

U.S. PATENT DOCUMENTS

| | | | | |
|---|---|---|---|---|
| 7,030,568 | B2* | 4/2006 | Boke et al. | 315/224 |
| 7,193,866 | B1* | 3/2007 | Huang | 363/22 |
| 7,233,113 | B2* | 6/2007 | Ongaro et al. | 315/219 |
| 7,973,496 | B2* | 7/2011 | Loef et al. | 315/297 |
| 8,330,391 | B2* | 12/2012 | Wendt et al. | 315/307 |
| 2005/0140311 | A1* | 6/2005 | Suzuki et al. | 315/209 T |
| 2008/0049453 | A1 | 2/2008 | Osaka | |

FOREIGN PATENT DOCUMENTS

| | | |
|---|---|---|
| WO | 2007102106 A2 | 9/2007 |
| WO | 2007148271 A2 | 12/2007 |
| WO | 2008029330 A2 | 3/2008 |
| WO | 2008110978 A1 | 9/2008 |
| WO | 2008152565 A2 | 12/2008 |
| WO | 2010109371 A1 | 9/2010 |

OTHER PUBLICATIONS

Yeung et al., "Investigation of multiple output operation for switched-capacitor resonant converters", International Journal of Circuit Theory and Applications, 2002, pp. 411-423.

Darryl J. Tschirhart et al; "A Cost-Effective Synchronous Rectifier Gating Signal Scheme for Constant Frequency Resonant Converters", IEEE ISIE 2006, Jul. 9-12, 2006, Montreal, Quebec, CA, pp. 1235-1240.

Dianbo Fu et al; 1MHz High Efficiency LLC Resonant Converters With Synchronous Rectifier, IEEE 2007, pp. 2404-2410.

Marian K. Kazimierczuk et al; "Frequency-Controlled Series-Resonant Converter With Synchronous Rectifier", IEEE Transactions on Aerospace and Electronic Systems, vol. 33, No. 3, Jul. 1997, pp. 939-948.

J.A. Cobos et al; :Study of the Applicability of Self-Driven Synchronous Rectification to Resonant Topologies, IEEE 1992, pp. 933-940.

Brian Acker et al; "Synchronous Rectification With Adaptive Timing Control", IEEE 1995, 0-7803-2730, pp. 88-95.

H. Van Der Broeck et al; "Novel Series Resonant Driver for LED Lighting", PR-TN 2007/00350, Jun. 2007.

* cited by examiner

SUPPLY CIRCUIT HAVING AT LEAST ONE SWITCHING UNIT COUPLED BETWEEN A BRIDGE CIRCUIT AND AN ASSOCIATED LOAD CIRCUIT

FIELD OF THE INVENTION

The present invention relates to a supply circuit and to a device comprising a supply circuit and at least one load circuit.

BACKGROUND OF THE INVENTION

Supply circuits, in particular switched mode power supplies, are well known in the art. Such supply circuits are used to power consumer and non-consumer products. An exemplary application is the powering of light-emitting diodes (LEDs) and/or organic light-emitting diodes (OLEDs) or other lighting systems, in particular LED strings used in professional LED lighting systems, in particular lighting systems, where a precise color control is required. Further applications are LED backlighting, effect and accent illumination used for consumer products like "living colors lamps" and furthermore color temperature adjustment in general illumination applications as well as homogenizing the light output of single LEDs of the multiple LED lamp with a single supply circuit. It should be noted that in the following, the term "LED" is used as a generic term for similar applications such as OLEDs or the like.

Supply circuits that are best suited and therefore are preferably used for the above-named applications are in particular discontinuous series resonant converter with a constant average current output, in the following denoted as DSRC-I. The functionality of this type of converter is commonly known, e.g., from WO 2007/148271 A2 or WO 01/45241 A1 and shall therefore not be explained in detail. DSRC-I converters provide the advantage of a constant average current output, furthermore, no current sensing and no current control loop is required. Consequently, losses caused by a current sensing are avoided, and the DSRC-I provides a high-efficient, compact and easy design compared to other commonly known supply circuits. Above all, it is open and short circuit proof.

The basic DSRC-I topology provides only one single output of the supply circuit, in order to power a single load circuit, which is coupled to the supply circuit. However, with regard to the application of the supply circuit in general illumination applications, it is desirable to not only have one but multiple outputs in order to power different load circuits, e.g., comprising different colored LED strings such as red, green and blue LED strings.

As an example, a "living colors lamp" needs to be able to emit light of a huge number of colors generated by individually dimming and mixing the emitted light of red, green and blue LEDs in a certain ratio. Thus, by mixing the base colors red, green and blue (RGB), more than 16 million colors may be calculative generated. Also with regard to backlighting of liquid crystal displays (LCDs), LEDs are increasingly becoming the technology of choice. Thereby, the supply circuit is the key to the quality of the backlight image. The driver i.e., the supply circuit must be capable of providing a satisfactory dimming range that is high brightness for daylight vision and low brightness for night vision.

The commonly used dimming method for a DSRC-I is to reduce the switching frequency. However, this method is limited and hence does not provide a satisfactory dimming range. Furthermore, reducing the switching frequency will influence all outputs of a DSRC-I having multiple outputs. Consequently, this method allows no individual dimming of single outputs and thus, individual dimming for example of red, green and blue light and consequently, does not permit color control.

There have been made attempts to realize individual dimming LED strings. As an example, WO 2008/110978 describes a method, which uses additional switches in the load circuit to bypass the load. However, bypassing the load has harmful influences on the converter stability and reduces the overall efficiency.

As can be seen from the above explanations, there is a need for providing a supply circuit as well as a device comprising said supply circuit permitting individual dimming of individual outputs of the converter without negative influences on the converter stability and having a compact and easy design.

SUMMARY OF THE INVENTION

It is an object of the present invention to provide a supply circuit offering an individual full range dimming and high-efficiency combined with a simple control.

In a first aspect of the present invention a supply circuit comprising:
  a bridge circuit,
  at least one resonant circuit coupled to the bridge circuit, the at least one resonant circuit being coupleable to a load circuit comprising one or more loads,
  at least one supply switching unit coupled between the bridge circuit and an associated load circuit for connecting and disconnecting the load circuit from the bridge circuit, and
  a control unit for controlling the at least one supply switching unit in synchronization with a resonant current of the resonant circuit associated with said supply switching unit.

The number of supply switching units preferably corresponds to the number of resonant circuits or in other words, at least one supply switching unit is assigned to each resonant circuit.

Hence, full range dimming is achieved by inserting just one supply switching unit per load circuit in the supply circuit, in particular in the at least one resonant circuit, which connects and disconnects the load for a desired number of switching cycles of the bridge circuit by means of a control unit. Further, this supply switching unit can be gated very easily and a normal MOSFET is sufficient, as for this method no bidirectional blocking switch is required. Additionally, the advantage to interleave certain LED strings is offered. Furthermore, the above-named advantages of the DSRC-I converter itself are still valid with this modification. Consequently, there is still no current sensing and controlling required. Furthermore, an individual full range dimming down to zero is permitted, whereas a high-efficiency is provided at all dimming levels. Altogether, this invention offers in particular the advantage of controlling several different LED strings individually with only one central converter.

In a further aspect of the present invention a supply circuit is presented, wherein a plurality of resonant circuits is coupled to the bridge circuit and each resonant circuit being coupleable to a load circuit, each load circuit constituting an output of the supply circuit. Preferably, per resonant circuit, one supply switching unit is provided, whereas the supply switching unit in particular forms part of the respective resonant circuit. Hence, each resonant circuit is preferably provided with a supply switching unit.

In particular, the supply circuit is preferably provided with three resonant circuits, whereas the first of said resonant circuits being coupled to a load circuit comprising one or more red LEDs and/or OLEDs, the second of said resonant circuits being coupled to a load circuit comprising one or more green LEDs and/or OLEDs, and the third of said resonant circuits being coupled to a load circuit comprising one or more blue LEDs and/or OLEDs. With this configuration it is possible to control the color of the light emitted by the respective device, as the different colored LEDs of each load circuit may be controlled individually to generate a desired color mixture.

In a further aspect of the present invention a supply circuit is presented, wherein the bridge circuit is based on a half bridge. However, it is also possible that the bridge circuit is based on a full bridge.

As mentioned above, dimming of a DSRC-I is basically realized by reducing the switching frequency. This method is preferably used with the full-bridge DSRC-I, because the peak value of the additional current in a zero voltage switching (ZVS) snubber circuit, which will be explained in more detail later on, remains constant if the switching frequency is reduced. With the half-bridge configuration this current increases if the switching frequency is reduced. Hence, a half-bridge DSRC-I offers no good dimming solution, when dimming is performed by varying the switching frequency. The present invention, however, may be carried out by using a half bridge as well as a full bridge, whereas using a half bridge configuration is even preferred, as only two switches are required for realizing the bridge circuit and therewith an easy control of the switches is provided.

In a further aspect of the present invention a supply circuit is presented, wherein the supply switching unit is connected in series to the one or more loads of the load circuit.

This provides the advantage that the load is not only bypassed, which has harmful influences on the converter stability and leads to a reduction of the overall efficiency. Rather, the load is simply disconnected for a desired number of switching cycles from the supply circuit. In this respect, the term "disconnected" means that current flow from the load circuit back to the bridge circuit is interrupted by the supply switching unit.

In a further aspect of the present invention a supply circuit is presented, wherein the control unit is adapted for providing a maximum switching frequency of the bridge circuit, which is half of a resonant frequency of the resonant circuit. Furthermore, a control unit is preferably adapted for providing a maximum switching frequency of the bridge circuit, which is preferably half of the lowest resonant frequency, if a plurality of resonant circuits are employed, whereas the resonant circuits defining different resonant frequencies. The control unit may be the control unit driving the supply switching unit, however, it may also be a separate control unit only driving the bridge circuit.

In a further aspect of the present invention a supply circuit is presented, wherein the control unit is adapted for switching on or off the supply switching unit during the second negative half-wave of the resonant current. This is advantageous as the resonant current commutates on the body diode of the supply switching unit and stops after it reaches zero. If the load is switched off, it is switched on again by a switching on the respective supply switching unit, in particular the respective MOSFET in the same time interval that is in the second negative half-wave of the resonant current.

It is another object of the present invention to provide a device comprising the supply circuit as defined in claim 1 and at least one load circuit.

In a further aspect of the present invention a device is presented, wherein each load circuit coupleable to a resonant circuit comprises one or more LEDs and/or one or more OLEDs, each having a different color. Hence, each load circuit, i.e., each output of the supply circuit may comprise at least one LED/OLED of a specific color, in particular red, green or blue. This provides the advantage of dimming each of these load circuits and with this each of the different colored LEDs individually.

In a further aspect of the present invention a device is presented, wherein at least one of the load circuits comprising LED strings having an anti-parallel configuration. This provides the advantage that the load may be operated by alternating current (AC).

In a further aspect of the present invention a device is presented, wherein at least one photosensitive component is provided interacting with at least one load circuit. This allows the easy detection of a system fault or a damaged LED as well as calibrating the LEDs or compensating aging effects. Above all, a perfect color control is feasible with the photo sensitive component.

Consequently, a novel supply circuit and a corresponding device comprising the supply circuit are presented for effectively dimming a load circuit and in particular performing precise color control. The solution for these requirements is described in this invention.

These and other aspects of the invention will be apparent from and elucidated with reference to the embodiment described hereinafter.

BRIEF DESCRIPTION OF THE DRAWINGS

In the following drawings

DETAILED DESCRIPTION OF THE INVENTION

Figure 1:
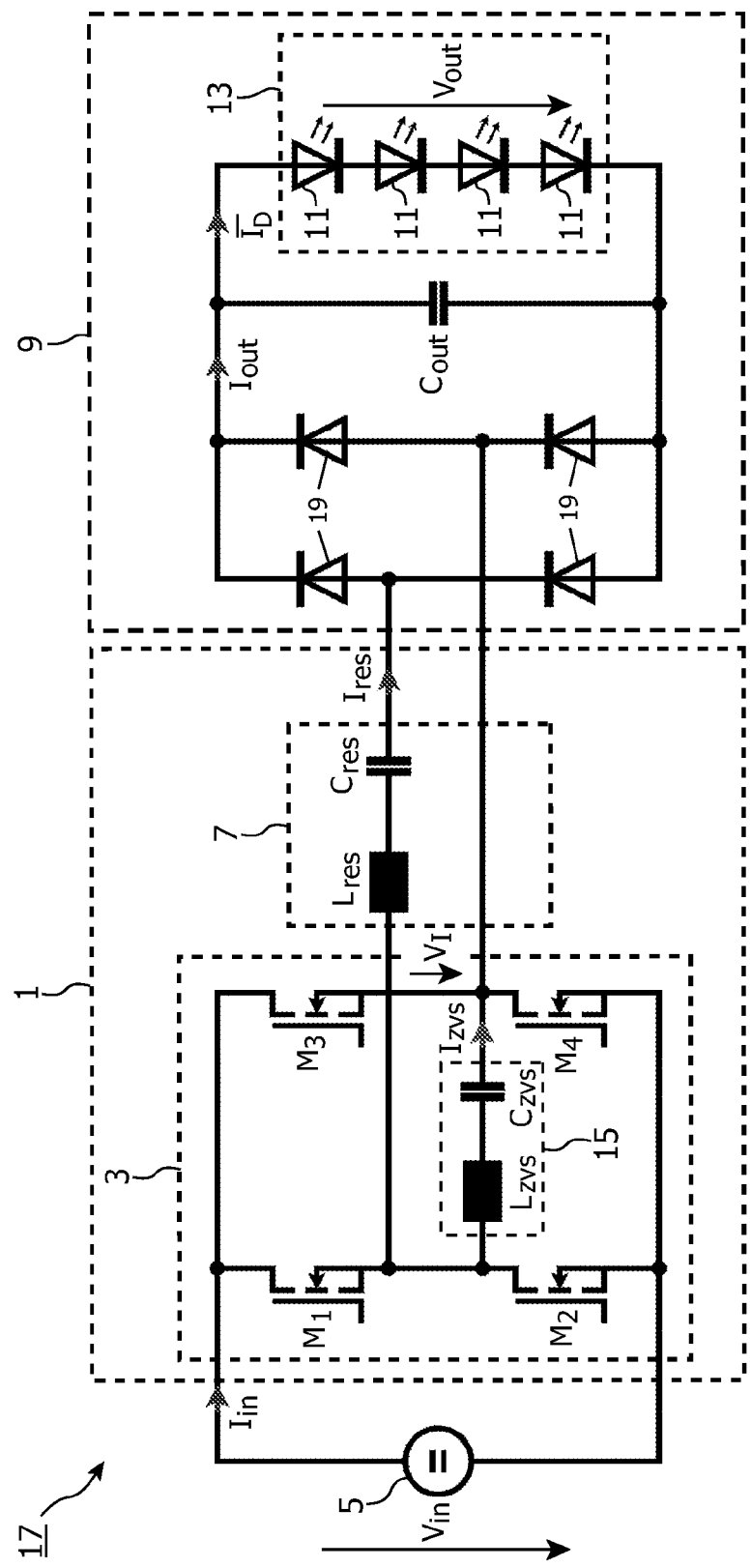
FIG. 1 illustrates a block diagram of a supply circuit known in the art coupled to a load circuit.

FIG. 1 illustrates a block diagram of a supply circuit 1 known in the art. The supply circuit 1 comprises a bridge circuit 3 and is coupled to a power source 5. The power source 5 is a direct voltage source $V_{in}$. The supply circuit 1 further comprises a resonant circuit 7 and is coupled to a load circuit 9 comprising at least one loads, in FIG. 1 a total number of four loads 11 forming together a load string 13. The loads 11 may be LEDs, OLEDs or the like that are powered by the supply circuit 1.

The bridge circuit 3 illustrated in FIG. 1 is based on a full bridge comprising four switches $M_1$, $M_2$, $M_3$ and $M_4$, which are exemplary MOSFETs in FIG. 1. The switching status of the switches $M_1$, $M_2$, $M_3$ and $M_4$, i.e., whether they are switched on or off, is controlled by a control unit not illustrated in FIG. 1.

Furthermore, a snubber circuit 15 forms part of the bridge circuit 3, which comprises an inductance $L_{zvs}$ and a capacitance $C_{zvs}$. The snubber circuit 15 provides an additional current $I_{zvs}$, which is required for discharging the MOSFET's (internal) capacitance in order to achieve zero voltage switching (ZVS) leading to a reduction of switching losses. Hence, the snubber circuit 15 serves for achieving a high-efficiency and an additional ZVS, whereas ZVS is well-known in the art and is therefore not explained in more detail hereinafter. The snubber circuit 15 may also be integrated in a transformer together with the resonant circuit 7. It should be noted that other measures may be taken to achieve ZVS.

The supply circuit 1 and the load circuit 9 constitute a device 17, which may be a consumer or a non-consumer product.

The resonant circuit 7 comprises an inductance $L_{res}$ and a capacitance $C_{res}$, which are connected in series in FIG. 1. The inductance $L_{res}$ and the capacitance $C_{res}$ define a resonant frequency and a resonant impedance of the resonant circuit 7. Hence, the bridge circuit 3 and the resonant circuit 7 together form a series resonant converter. The switches $M_1$, $M_2$, $M_3$ and $M_4$ of the bridge circuit 3 are preferably switched pairwise with a duty-cycle of 50%. It should be noted that other duty-cycles may be applied to the switches such as 75% for the lower switches and for the upper switches 25%. Furthermore, the maximum switching frequency of the bridge circuit 3 is preferably half the resonant frequency of the resonant circuit 7.

In response to a direct current from the power source 5, the bridge circuit 3 communicates a voltage signal to the resonant circuit 7 at a switching frequency, which in turn communicates an alternating current $I_{res}$ to the load circuit 9.

Furthermore, decoupling diodes 19 are provided that may form part of the resonant circuit 7 or the load circuit 9. Above all, a smoothing capacitance $C_{out}$ is connected in parallel to the load string 13, which avoids a pulsating current in the loads 11. It should be noted that the smoothing capacitance $C_{out}$ is not mandatory and may be omitted.

Figure 2:
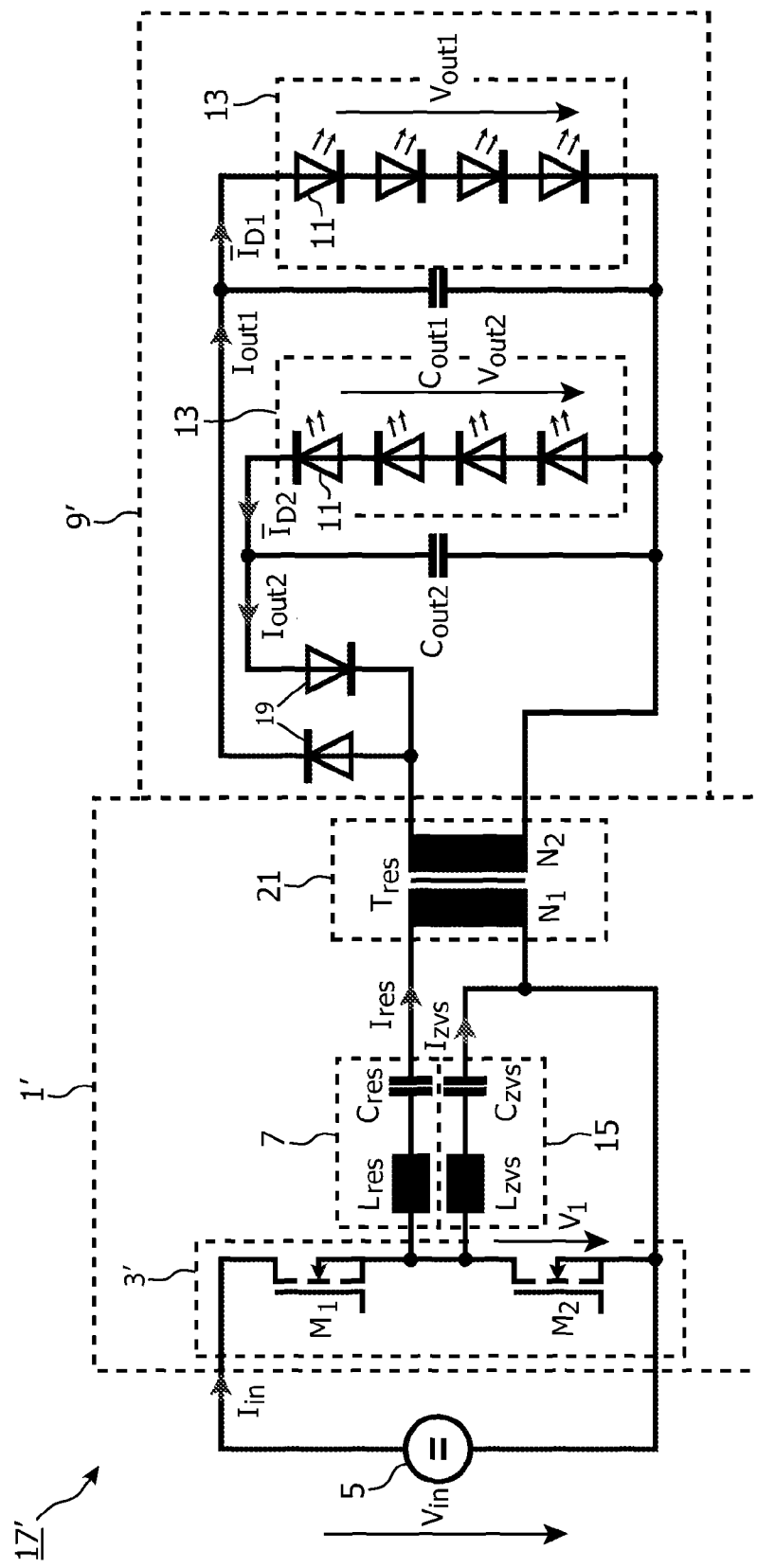
FIG. 2 illustrates a block diagram of another supply circuit known in the art coupled to a load circuit.

FIG. 2 illustrates a block diagram of a further supply circuit 1' known in the art and coupled to a load circuit 9'. As can be seen from FIG. 2, the supply circuit 1' differs from the supply circuit 1 illustrated in FIG. 1 in that the bridge circuit 3' of the supply circuit 1' is based on a half bridge instead of a full bridge. Hence, the half bridge only comprises two switches $M_1$ and $M_2$, which are exemplary MOSFETs. Again, the driver to control the switches $M_1$ and $M_2$ is not illustrated in FIG. 2.

In contrast to the supply circuit 1 of FIG. 1, a transformer 21 comprising a primary winding $N_1$ and a secondary winding $N_2$ is provided in the supply circuit 1' of FIG. 2, which is coupled to a load circuit 9' and the resonant circuit 7, the resonant circuit 7 again comprising the inductance $L_{res}$ and the capacitance $C_{res}$ defining a resonant frequency and a resonant impedance. The transformer 21 may serve to transform the input voltage $V_{in}$ to a higher or a lower output level $V_{out}$ and is not necessarily provided in the supply circuit 1'. Rather, it may be substituted by other additional components such as a voltage doubler circuit or it may be simply omitted.

As can be seen from FIG. 2, the load circuit 9' comprises two decoupling diodes 19 as well as two LED strings 13, which are arranged in an anti-parallel configuration. Each of them is provided with a smoothing capacitance $C_{out1}$ and $C_{out2}$. It will be appreciated that the load configuration is variable and may vary depending on the application.

Both, the supply circuit 1 of FIG. 1 and the supply circuit 1' of FIG. 2 show basic DSRC-I configurations that both provide a constant average output current $I_{out}$ without sensing the current. It shall be noticed that the half-bridge configuration of the supply circuit 1' is preferably used as less components are required and the control signals are easier to handle than those of a full bridge.

It is obvious from FIG. 1 and FIG. 2 that the supply circuits 1 and 1' both comprise a resonant circuit 7, which is coupled to a load circuit 9, 9' comprising exemplary a plurality of loads 11, in particular load strings 13. The loads 11 or the load strings 13 respectively may be LEDs or OLEDs.

If a color is to be controlled for a certain consumer or non-consumer application, it is advantageous if the supply circuit is provided with at least three outputs, i.e., three load circuits 9, 9', whereas each of the three load circuits may comprise at least one different colored LED, e.g., one load circuit comprising at least one red LED, another load circuit comprising at least one green LED and the third load circuit comprising at least one blue LED. The different colored light of the different load circuits may then be mixed in a certain ratio to generate a desired color. Therefore, the at least one load 11 of a load circuit 9 needs to be individually dimmed in order to perform color control.

Up to now, dimming is commonly performed by varying the switching frequency of the bridge circuit 3, 3', which brings along the disadvantages described previously. In particular, individual full range dimming of different outputs, i.e., of different load circuits 9, 9' is not feasible with this method, as a change in switching frequency will influence the current in all load circuits similarly. By contrast, the present invention provides an individual full-range dimming of an arbitrary number of load circuits 9, thus, allowing color control for a large number of applications.

Figure 3:
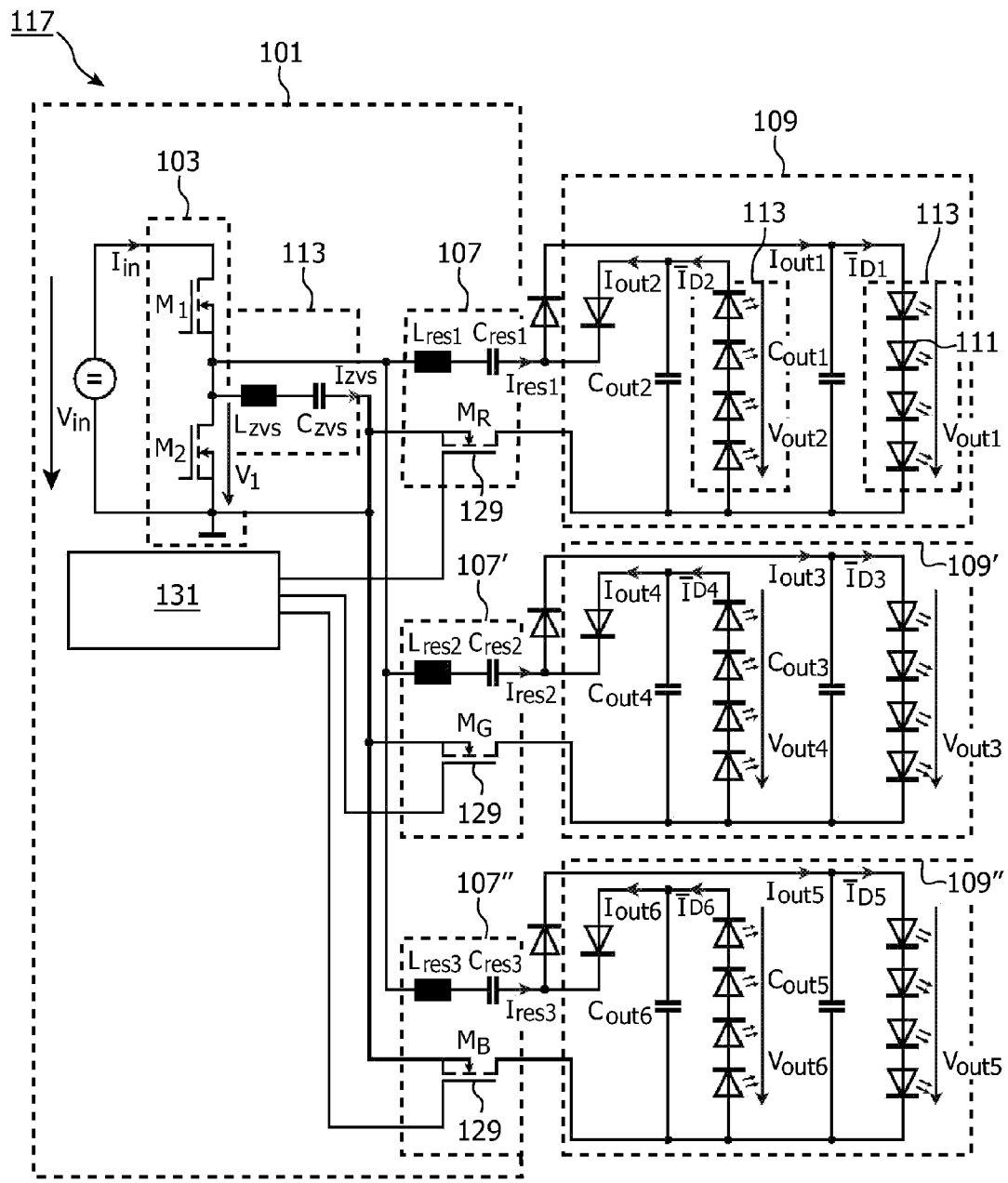
FIG. 3 illustrates a block diagram of a supply circuit in accordance with the present invention coupled to a total number of three load circuits.

FIG. 3 illustrates a schematic diagram of a supply circuit 101 according to the present invention coupled to a total number of three load circuits 109, 109' and 109". Each of the load circuits 109, 109' and 109" in turn comprises a number of loads 111 that are combined in two load strings 113 connected in an anti-parallel configuration.

The number of loads 111 per load circuit 109, 109' and 109" as well as the number of load circuits itself may vary. Thus, it is possible to provide only one load circuit 109 comprising a single load 111, which may be a LED or the like. However, the present invention is particularly advantageous, if at least three load circuits 109, 109' and 109" are coupleable to the supply circuit 101.

It will be appreciated that also the configuration of the loads 111 may vary. In FIG. 3 they are merely exemplary configured in the form of load strings 113, whereas two load strings 113 are provided per load circuit 109, 109', 109", which are above all configured in an anti-parallel way, i.e., with opposite polarizations.

The supply circuit 101 comprises a bridge circuit 103, which is based on a half bridge, whereas the half bridge and its advantages have previously been addressed to in the context of FIG. 2. The supply circuit 101 further comprises at least one, in FIG. 3 a total number of three resonant circuits 107, 107' and 107". Each of the resonant circuits 107, 107' and 107" in turn is coupleable to a load circuit 109, 109' and 109".

The switches $M_1$ and $M_2$ of the bridge circuit 103 are preferably controlled by means of a control unit, which is adapted to switch the bridge circuit with a duty-cycle of 50% and a maximum switching frequency, which is half the resonant frequency of the resonant circuits 107, 107', 107", whereas the resonant circuits consist of the inductance $L_{res}$ and the capacitance $C_{res}$. The dimensioning of $L_{res}$ and $C_{res}$ may vary in each resonant circuit 107, 107' and 107". In particular, the resonant frequency of one or more resonant circuits may differ from those of the other resonant circuits. In this case, the resonant circuit 107, 107' or 107" having the lowest resonant frequency determines the limit for the switching frequency of the bridge circuit 103 in order to fulfill the condition that the maximum switching frequency of the bridge circuit is half the resonant frequency of the resonant circuit. In this case, the control unit is adapted for providing a maximum switching frequency of the bridge circuit 103, which is half of the lowest resonant frequency of a plurality of resonant circuits 107, 107', 107".

For an individual dimming of loads 111 in accordance with the present invention, the supply circuit 101 comprises at least one supply switching unit 129 to connect or disconnect the one or more loads 111 from the supply circuit 101. The supply switching unit 129 is coupled between the bridge circuit 103 and an associated load circuit 109 for connecting and disconnecting the load circuit 109 from the bridge circuit 103. A control unit 131 for driving the supply switching unit 129 is adapted for switching on or off the supply switching unit 129 in synchronization with a resonant current $I_{res}$ of the resonant circuit 107, 107', 107" associated with said supply switching unit 129, which will be explained in detail hereinafter.

Moreover, the at least one supply switching unit 129 is preferably a MOSFET. However, it should be noted that the supply switching unit 129 may also comprise any other component being suited for connecting or disconnecting the one or more loads 111 and the load circuit 109 respectively from the bridge circuit 103. The supply switching unit 129 may also comprise a plurality of components.

It is obvious from FIG. 3 that in particular, the resonant circuit 107, 107', 107" is provided with at least one supply switching unit 129. Preferably, the number of resonant circuits corresponds to the number of supply switching units 129. It should be noted that the at least one supply switching unit 129 is connected in series to the one or more loads 111 of the load circuit 109, 109', 109" or in other words, the supply switching unit 129 is interconnected between the bridge circuit 103 and the respective load circuit 107, 107' or 107". Hence, a series connection of the resonant inductance $L_{res}$, the resonant capacitance $C_{res}$, the entity of loads 111 and the supply switching unit 129 is resulting.

In order to use the supply circuit 101 for various applications, preferably a plurality of resonant circuits 107, 107' and 107" is coupled to the bridge circuit 103 and each resonant circuit 107, 107' and 107" in turn being coupleable to at least one load circuit 109, 109', 109". The respective load circuit 109, 109', 109" coupleable to a resonant circuit 107, 107', and 107" may comprise one or more LEDs and/or one or more OLEDs.

It is obvious from FIG. 3 that a device 117 according to the invention comprises the supply circuit 101, that is the bridge circuit 103, the resonant circuits 107, 107', 107", the supply switching units 129 and the load circuits 109, 109', 109".

A preferred embodiment of the present invention, which is illustrated in FIG. 3 incorporates the following constitution: The supply circuit 101 comprises three resonant circuits 107, 107', 107", whereas the first of said resonant circuits 107 is coupled to a load circuit 109 comprising at least one red LED and/or OLED, the second of said resonant circuits 107' is coupled to a load circuit 109' comprising at least one green LED and/or OLED, and the third of said resonant circuits 107" is coupled to a load circuit 109" comprising at least one blue LED and/or OLED.

If the loads 111 are LEDs or OLEDs, a variable light output of different colored (O)LEDs can then be realized. As mentioned above, the supply switching units 129 are exemplary MOSFETs, however, any other suited type of switching device may be applied.

The supply switching units 129 are preferably controlled by the control unit 131, which may be additionally adapted to control the switches $M_1$ and $M_2$ of the bridge circuit 103. In this case, only one single control unit is required for both, controlling the bridge circuit 103 as well as the supply switching unit 129.

As can be seen from FIG. 3, the resonant circuits 107, 107' and 107" are each provided with a supply switching unit 129. The supply switching unit 129 of resonant circuit 107 is denoted in FIG. 3 as $M_R$, supply switching unit 129 of resonant circuit 107' is denoted as $M_G$ and supply switching unit 129 of resonant circuit 107" is denoted as $M_B$. The denotation indicates that the loads 111 of load circuit 109 are preferably red LEDs, the loads 111 of load circuit 109' are preferably green LEDs and the loads 111 of load circuit 109" are preferably blue LEDs.

Each supply switching unit 129 is connected in series to the respective loads 111 or is coupled between the bridge circuit 103 and the associated load circuit 109. In the following, the operation of the supply switching unit 129 will be explained in more detail. It will be appreciated that employment of the term "a load 111" is only used as a generic term that may include any number of loads as well as different types of loads such as LEDs and/or OLEDs, whereas the configuration of the loads is in addition arbitrary.

Figure 4:
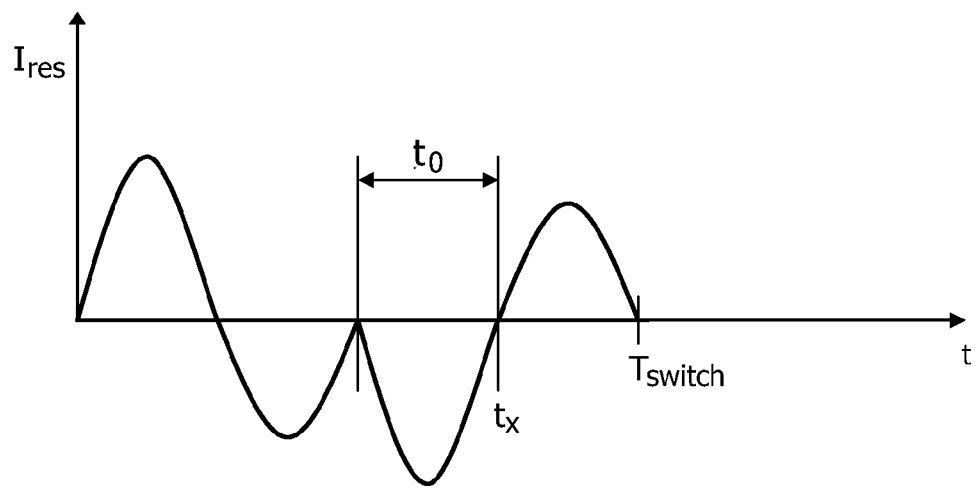
FIG. 4 illustrates a resonant current signal of the resonant circuit.

In order to control a load 111 of a load circuit 109, 109' or 109", the supply switching unit 129 is switched on or off by means of the control unit 131. If the load 111, in particular one or more LEDs is to be disconnected, e.g., in order to reduce the light output, the supply switching unit 129 is switched off preferably during the second negative half-wave of the resonant current $I_{res}$, thus, during the time period $t_0$ illustrated in FIG. 4, whereas FIG. 4 shows the basic, not interrupted resonant current $I_{res}$ depending on a change in time t. Additionally, the periodic time $T_{switch}$ of the bridge circuit 103 is illustrated in FIG. 4. It will be appreciated that although the resonant current $I_{res}$ is AC, there is no bidirectional blocking switch required.

After switching off the supply switching unit 129, i.e. the MOSFET, the resonant current $I_{res}$ commutates on the not illustrated intrinsic body diode of the MOSFET and stops after it reaches zero at the time $t_x$ illustrated in FIG. 4. Further current flow does not occur, because the resonant capacitance $C_{res}$ is charged the way that the body diode of the MOSFET blocks further current flow. Hence, current flow from the load circuit 109 back to the bridge circuit 103 is prevented by the supply switching unit 129. In this condition, the load 111 is disconnected from the supply circuit 101.

Outgoing from the situation that a load 111 has been switched off, i.e. disconnected from the supply circuit 101 by switching off the respective supply switching unit 129, the load 111 is switched on again by switching on the respective supply switching unit 129, whereas switching on is preferably performed in the same time interval $t_0$ as switching off the supply switching unit 129, namely during the second negative half-wave of the resonant current $I_{res}$. As a consequence, the resonant current $I_{res}$ will restart with the second positive half-wave after the time $t_x$ as if no interruption had occurred, in particular, if a full bridge is applied.

If a half bridge is applied as illustrated in FIG. 3, the second positive half-wave of the resonant current $I_{res}$ preferably restarts directly after switching on the supply switching unit 129 in the time interval $t_0$ and not only at the time $t_x$. Hence, if using a half bridge, the second positive half-wave of the resonant current $I_{res}$ may begin before the time $t_x$. However, this won't cause any problems as after the expiration of the second positive half-wave the current will stay zero for a certain period of time, in particular if a sufficiently high output voltage is applied.

In order to reduce switching losses, the supply switching unit 129 is preferably switched as late as possible in the time interval $t_0$, i.e., as close as possible to the time $t_x$. Above all, this will solve the problem of switching the supply switching unit 129 prior to the time $t_x$ in case that a half bridge is applied and hence the subsequent second positive half-wave of the resonant current $I_{res}$ already starting before the time $t_x$.

Hence, the light output of a load circuit 109, 109' and 109" may be varied only by varying the number of omitted switching cycles $T_{switch}$ of the bridge circuit 103.

The information about when the resonant current $I_{res}$ is in the second negative half-wave of the switching period or switching cycle $T_{switch}$, i.e., in the time interval $t_0$ for switching the supply switching unit 129 is gained from the switching signals of the bridge circuit 103. The relation is very simple because the behavior of the resonant current $I_{res}$ is known. Hence, the switching operation of the supply switching units 129 is adjusted to the switching signals of the half or full bridge circuit 103.

The switching cycle of the bridge circuit 103, i.e., of switches $M_1$ and $M_2$ is not interrupted while switching on and off the supply switching unit 129. In addition, the bridge circuit 103 operates constantly with complete zero voltage switching because it is not interrupted or influenced by the dimming of the individual loads 111.

It shall be understood that each supply switching unit 129, i.e., $M_R$, $M_G$ and $M_B$ may be switched on and off fully independent from each other. Also the number of switching cycles $T_{switch}$, during which a supply switching unit 129 is switched on or off is variable and independent from each other. Consequently, each load circuit 109, 109', 109" being coupled to a supply switching unit 129 may be individually controlled only by switching on or off the respective supply switching unit 129 for a desired number of switching cycles of the bridge circuit 103.

It is obvious that a large number of supply switching units 129 may be provided, each realizing an individual full-range dimming of one or more LEDs, OLEDs or the like. Thereby, only one central converter, i.e., one central bridge circuit 103 is required.

It will be appreciated that according to the present invention, the load is not bypassed by means of a supply switching unit connected in parallel to a load 111, which has harmful influences on the converter stability. According to the present invention, the supply switching unit 129 is rather connected in series to the load 111 in order to avoid bypassing the load. Instead, the load is disconnected for a desired number of switching cycles $T_{switch}$ of the bridge circuit 103, as the supply switching unit 129 blocks a current flow back to the bridge circuit 103. Meanwhile, the supply circuit 101 is not at all influenced by the supply switching unit 129 as the load 111 is not bypassed, but current flow is interrupted.

Consequently, this invention offers the advantages of an individual full-range dimming down to zero, whereas the complete ZVS operation is kept also during dimming of the individual loads 111. Another advantage of the present invention is low additional losses as MOSFETs with a low RDSon can be used. Furthermore, the supply circuit topology can be enhanced to any desired number of load circuits 109 and loads 111 and with this to any desired number of individual dimmable LEDs. Finally, interleaving of LEDs is also possible with the present invention to reduce the overall input current ripple.

As mentioned above, the DSRC-I preferably used for the present invention may instead of a half-bridge comprise a full-bridge configuration. However, the major advantage of the half-bridge is that the source of the supply switching unit 129, i.e., the source of the MOSFET is connected to ground. Consequently, driving this MOSFET is very easy. Furthermore, fewer components are required as can be seen from FIG. 4: The device 117 comprising the supply circuit 101 and the three load circuits 109, 109' and 109" only requires three supply switching units 129 and two switches $M_1$ and $M_2$ for realizing an individual dimming functionality for each load circuit 107.

Figure 5:
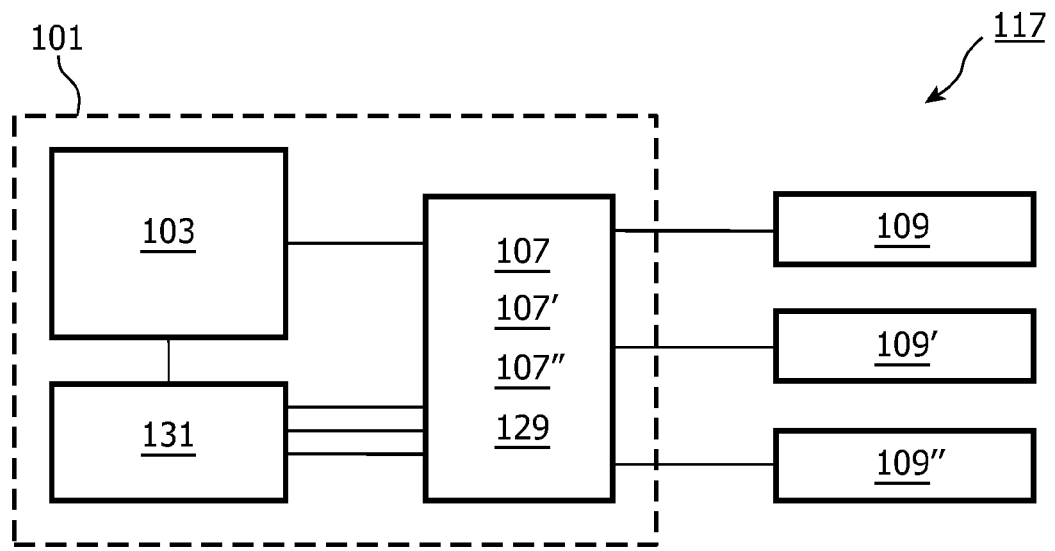
FIG. 5 illustrates a schematic diagram of a device in accordance with the present invention.

FIG. 5 illustrates a schematic diagram of a device 117 in accordance with the present invention comprising the load circuits 109, 109' and 109" and the supply circuit 101 comprising the bridge circuit 103, the resonant circuits 107, 107', 107" and the supply switching unit 129. It becomes obvious that for the individual dimming of different colored LEDs only one central converter unit is required. The individual full-range dimmer interposed between the load circuits 109, 109' and 109" and the bridge circuit 103 comprises the resonant circuits 107, 107' and 107" with the associated supply switching units 129. It is further obvious from FIG. 5 that the control unit 131 is adapted for driving the supply switching units 129 and the bridge circuit 103 at the same time.

As the light output of an LED is basically proportional to the current, the supply circuit 101 can generate all desired colors without the need of any feedback loop, because of the constant average current output behavior of the DSRC-I. However, changes in temperature or aging of the LED can influence the light to current ratio of the LED. If the light output has to be more precise, the light of each LED can be sensed by a photosensitive component such as a photo sensor, in particular a photodiode. The light output can then be controlled simply by adjusting the corresponding load current. Sensing the light output is advantageous as it provides lower losses and more advantages than sensing the load current.

For example, it allows the easy detection of a system fault or a damaged LED as well as calibrating the LEDs or compensating aging effects. Above all, a perfect color control is feasible with the photo sensitive component.

Figure 6:
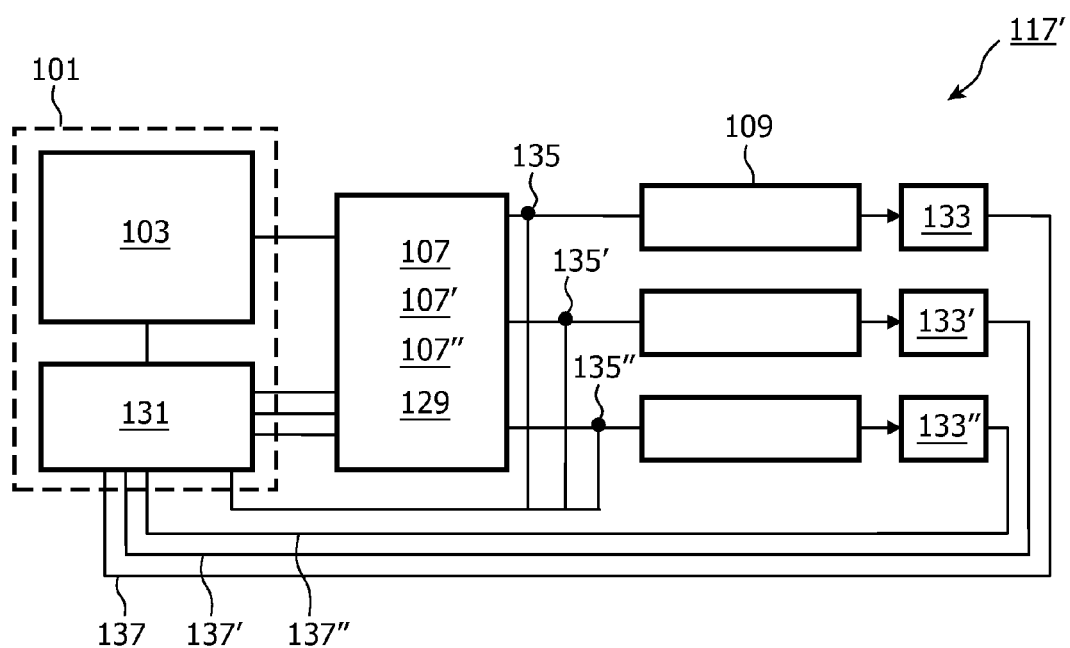
FIG. 6 illustrates a schematic diagram of an embodiment of a device in accordance with the present invention.

FIG. 6 illustrates a schematic diagram of a device 117' in accordance with the present invention comprising photosensitive components 133, 133', 133". Preferably, at least one photosensitive component 133, 133', 133" is assigned to at least one load circuit 109, 109', 109", in particular to the loads 111 of the load circuits. It is conceivable that each load 111 is associated with a photosensitive component 133. Those areas, where the currents in the device 117' are particularly known are denoted in FIG. 6 with 135, 135' and 135". These currents may be adapted particularly by means of the control unit 131 in accordance with the sensing result of the photosensitive component 133, whereas the sensing results of the photosensitive components 133, 133' and 133" are fed to the control unit 131 as an example by interconnections 137, 137' and 137".

While the invention has been illustrated and described in detail in the drawings and foregoing description, such illustration and description are to be considered illustrative or exemplary and not restrictive; the invention is not limited to the disclosed embodiment. Other variations to the disclosed embodiment can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measured cannot be used to advantage.

Any reference signs in the claims should not be construed as limiting the scope.

The invention claimed is:

1. A supply circuit, comprising:
   a bridge circuit;
   one or more resonant circuits coupled to the bridge circuit, each of the one or more resonant circuits being configured to be connected to a corresponding load circuit among one or more load circuits each of which includes one or more loads;
   one or more supply switching units, each of the one or more supply switching units being associated with a corresponding one of the one or more resonant circuits and being coupled between the bridge circuit and an associated one of the one or more load circuits for connecting and disconnecting the associated load circuit from the bridge circuit; and
   a control unit for controlling each of the one or more supply switching units in synchronization with a resonant current of the resonant circuit associated with said supply switching unit.

2. The supply circuit of claim 1, wherein the one or more resonant circuits comprises a plurality of resonant circuits.

3. The supply circuit of claim 2, wherein the control unit is adapted for providing a maximum switching frequency of the bridge circuit, which is half of a lowest resonant frequency of the plurality of resonant circuits.

4. The supply circuit of claim 1, the bridge circuit comprising a half bridge.

5. The supply circuit of claim 1, the bridge circuit comprising a full bridge.

6. The supply circuit of claim 1, wherein each of the one or more supply switching units is connected in series to the associated load circuit.

7. The supply circuit of claim 1, wherein the control unit is adapted for providing a maximum switching frequency of the bridge circuit, which is half of a resonant frequency of at least one of the one or more resonant circuits.

8. The supply circuit of claim 1, wherein the one or more resonant circuits comprises three resonant circuits, wherein the load circuit corresponding to a first of said three resonant circuits comprises at least one red LED and/or OLED, the load circuit corresponding to a second of said three resonant circuits comprises at least one green LED and/or OLED, and the load circuit corresponding to a third of said three resonant circuits comprises at least one blue LED and/or OLED.

9. The supply circuit of claim 1, wherein at least one of the one or more supply switching units is a transistor.

10. The supply circuit of claim 1, wherein the control unit is adapted for switching on or off each of the one or more supply switching units during the second negative half-wave of a resonant current of the resonant circuit associated with said supply switching unit.

11. The supply circuit of claim 1, wherein the control unit is configured to control a first supply switching unit among the one or more supply switching circuits to selectively open the first supply switching unit, wherein when the first supply switching unit is open, no current flows through the associated load circuit.

12. A device, comprising:
    one or more load circuits, each of the load circuits including one or more loads;
    a bridge circuit;
    one or more resonant circuits coupled to the bridge circuit, each of the one or more resonant circuits being coupled to a corresponding one of the one or more load circuits;
    one or more supply switching units, each of the one or more supply switching units being associated with a corresponding one of the one or more resonant circuits and being coupled between the bridge circuit and an associated one of the one or more load circuits for connecting and disconnecting the associated load circuit from the bridge circuit; and
    a control unit for controlling each of the one or more supply switching units in synchronization with a resonant current of the resonant circuit associated with said supply switching unit.

13. The device of claim 12, wherein each of the one or more load circuits comprises one or more LEDs and/or one or more OLEDs.

14. The device of claim 12, wherein at least one of the one or more load circuits comprises LED strings in an anti-parallel configuration.

15. The device of claim 12, wherein at least one photosensitive component is provided interacting with at least one of the one or more load circuits.

16. The device of claim 12, wherein the control unit is configured to control a first supply switching unit among the one or more supply switching circuits to selectively open the first supply switching unit, wherein when the first supply switching unit is open, no current flows through the associated load circuit.

17. A device, comprising:
    a bridge circuit;
    three resonant circuits coupled to the bridge circuit, each of the three resonant circuits being configured to be connected to a corresponding one of three load circuits, where each of the three load circuits includes one or more loads;
    three supply switching units, each of the supply switching units being associated with a corresponding one of the three resonant circuits and being coupled in series between the bridge circuit and a corresponding one of the three load circuits for connecting and disconnecting the corresponding load circuit from the bridge circuit; and
    a control unit configured to control each of the three supply switching units in synchronization with a resonant current of the resonant circuit associated with said supply switching unit.

18. The device of claim 17, further comprising the three load circuits.

19. The device of claim 18, wherein the control unit is configured to control a first supply switching unit among the three supply switching circuits to selectively open the first supply switching unit, wherein when the first supply switching unit is open, no current flows through the corresponding load circuit.

20. The device of claim 18, wherein the three load circuits comprise:
    a first lighting emitting unit for emitting a first light having a first color;
    a second lighting emitting unit for emitting a second light having a second color different from the first color; and
    a third lighting emitting unit for emitting a third light having a third color different from the first color and the second color,
    wherein the controller is configured to individually control switching times of the three supply switching units so as to individually control an amount of first light, second light, and third light emitted by the first, second and third light emitting units, respectively.

* * * * *